(12) United States Patent
Dachs et al.

(10) Patent No.: US 12,035,695 B2
(45) Date of Patent: Jul. 16, 2024

(54) PET FEEDING DEVICE AND METHOD FOR SUPPLYING AND OPENING CAPSULES

(71) Applicant: SMARTPETCARE AG, Wilen bei Wollerau (CH)

(72) Inventors: Markus Dachs, Horgen (CH); Stefan Stalder, Zollikofen (CH); Lorenz Klauser, Meikirch (CH)

(73) Assignee: SMARTPETCARE AG, Wilen bei Wollerau (CH)

( * ) Notice: Subject to any disclaimer, the term of this patent is extended or adjusted under 35 U.S.C. 154(b) by 243 days.

(21) Appl. No.: 17/432,460

(22) PCT Filed: Feb. 20, 2020

(86) PCT No.: PCT/EP2020/054465
§ 371 (c)(1),
(2) Date: Aug. 19, 2021

(87) PCT Pub. No.: WO2020/169724
PCT Pub. Date: Aug. 27, 2020

(65) Prior Publication Data
US 2022/0142120 A1    May 12, 2022

(30) Foreign Application Priority Data

Feb. 21, 2019   (CH) ................... 00223/19

(51) Int. Cl.
*A01K 5/01*    (2006.01)
*A01K 5/02*    (2006.01)
*B65F 1/14*    (2006.01)

(52) U.S. Cl.
CPC .......... *A01K 5/0121* (2013.01); *A01K 5/0114* (2013.01); *A01K 5/0128* (2013.01); *A01K 5/0225* (2013.01); *A01K 5/0233* (2013.01); *A01K 5/0275* (2013.01); *A01K 5/0291* (2013.01); *B65F 1/1405* (2013.01)

(58) Field of Classification Search
CPC .......... A01K 5/01; A01K 5/02; A01K 5/0114; A01K 5/0128; A01K 5/0121; A01K 5/0233; A01K 5/0275; A01K 5/0291; A01K 5/0225; B65F 1/1405; B65F 1/141; B65F 1/1421; B65D 1/30; B65D 1/32
See application file for complete search history.

(56) References Cited

U.S. PATENT DOCUMENTS

| | | | | |
|---|---|---|---|---|
| 1,608,901 A | * | 11/1926 | Miller ...................... | B65F 1/06 383/905 |
| 3,780,702 A | | 12/1973 | Waterbury | |

(Continued)

FOREIGN PATENT DOCUMENTS

| | | | | |
|---|---|---|---|---|
| EP | 3598480 A1 | * | 1/2020 | ............. B32B 38/10 |
| FR | 2701353 A1 | | 2/1993 | |

(Continued)

*Primary Examiner* — Ebony E Evans
(74) *Attorney, Agent, or Firm* — Seed IP Law Group LLP

(57) ABSTRACT

A pet feeding device (10) for supplying and opening filled containers (12) has at least one stamp for indenting and/or bending an edge (46) of the container (12). In a method for supplying and opening filled containers an edge of the container is indented and/or bent before opening about at least one substantially horizontal axis.

11 Claims, 4 Drawing Sheets

(56) References Cited

U.S. PATENT DOCUMENTS

| | | | | |
|---|---|---|---|---|
| 4,077,360 | A * | 3/1978 | Figlia | A01K 5/0291 |
| | | | | 119/51.12 |
| 4,189,808 | A * | 2/1980 | Brown | B65D 33/1625 |
| | | | | 24/30.5 R |
| 4,249,483 | A * | 2/1981 | Sobky | A01K 5/0291 |
| | | | | 426/115 |
| 4,949,678 | A * | 8/1990 | Demko | A01K 5/0121 |
| | | | | 119/61.54 |
| 5,056,679 | A * | 10/1991 | Lonczak | B65F 1/00 |
| | | | | 141/390 |
| 9,567,126 | B2 * | 2/2017 | Wilson | A01K 5/0291 |
| 10,781,091 | B2 * | 9/2020 | Procyshyn | B25J 21/00 |
| 11,673,728 | B2 * | 6/2023 | Sanfilippo | B65D 1/30 |
| | | | | 222/541.9 |
| 2010/0263596 | A1 * | 10/2010 | Schumann | A01K 5/0275 |
| | | | | 119/51.02 |
| 2013/0247829 | A1 * | 9/2013 | Taneja | A01K 5/0291 |
| | | | | 119/51.11 |
| 2014/0174041 | A1 | 6/2014 | Monti | |
| 2015/0053138 | A1 | 2/2015 | Ramsey et al. | |

FOREIGN PATENT DOCUMENTS

| | | | | |
|---|---|---|---|---|
| WO | 2007/090690 A1 | 8/2007 | | |
| WO | WO-2011130586 A2 * | 10/2011 | | B32B 43/006 |
| WO | 2013/166379 A1 | 11/2013 | | |
| WO | 2014/013319 A1 | 1/2014 | | |
| WO | 2015/198222 A2 | 12/2015 | | |
| WO | 2018/019782 A1 | 2/2018 | | |

* cited by examiner

PET FEEDING DEVICE AND METHOD FOR SUPPLYING AND OPENING CAPSULES

TECHNICAL FIELD

The invention relates to a pet feeding device and a method for supplying and opening capsules.

BACKGROUND

For people having pets it is not always convenient or practicable to serve food to the pet themselves. Especially serving canned food while being absent is a challenge. Consequently, it would be desirable to have a pet feeding device, which is fairly automated and, for example, is able to open capsules containing pet food and presenting the opened capsule to the pet.

Such a device is described in WO 2015/198222 A2, but for example suffers from the problem that cleanliness in the surroundings of empty capsules, which generally remain in the device, cannot always be ensured, until the empty capsules are disposed of.

This is considered in the apparatus of US 2015/0053138 A1, which, however, has a relatively complicated system for handling the containers. Similarly, as mentioned above, the apparatus of WO 2014/013319 A1 cannot reliably ensure cleanliness which also applies to the subject matter of FR 2 701 353 A1.

SUMMARY OF THE INVENTION

Thus, it is an object underlying the invention to provide a pet feeding device, which is improved particularly with regard to cleanliness and convenience in the context of collecting and disposing of empty capsules. Moreover, a corresponding method is to be provided.

This object is, firstly, solved by the pet feeding device of claim 1.

Accordingly, the pet feeding device or pet feeder according to the present invention comprises a stamp for indenting and/or bending an edge, in particular a radial edge of the capsule. This will provide for reliable opening of capsules, which will typically have a lid. The stamp will typically deform the capsule as such, which is typically made from a material having a high metal content, so that it will be plastically deformed, whereas the lid will preferably be radially shorter than the edge, so that it will remain in its initial orientation. Alternatively, it can have a significantly higher plastic content and will be elastically deformed, i.e. it will substantially return to its original shape. In particular, the capsule body, i.e. that part of the capsule which contains the food and is covered by a separate lid, can have a surrounding flange, which can for example be a few millimeters wide. The lid will preferably be radially shorter than the edge and can alternatively have essentially the same dimension as the outer head of the flange, but is advantageously not sealed to the flange at least in the outermost few millimeters. If a force is now applied onto the lid in the area of the flange, the flange will deform, in particular, it will be angled away from the lid, in other words, in a usual orientation of the container, downward, but the lid will not be deformed or essentially keep its shape, so that the resulting gap between the lid and the flange can be used for gripping the lid. Consequently, due to the deformation of the capsule, it can be reliably grabbed by an appropriate component of the pet feeding device. This also provides the significant advantage, that the measures for ensuring a reliable gripping of the lid are effected in the device itself as compared to a situation, in which the lid for example has a tab for gripping or any other, local means necessary for a reliable gripping of the lid. This generally has the consequence that the capsules have to be provided in the device with a defined orientation which always carries the risk of an inappropriate orientation being effected by the user, thus endangering a reliable gripping. Moreover, there is no risk that a necessary tab is deformed, for example, during transport of the capsules, which generally endangers a reliable gripping thereof. In contrast, by means of the above described, particularly preferred measure of providing a stamp for indenting and/or bending the capsule in the device, this can be arranged such that any component for gripping the lid will, with regard to its position, be appropriately adjusted to make use of the indentation or otherwise deformed flange of the capsule, as described above.

Preferred embodiments are described in the further claims. In this context, it is to be emphasized that the features of all dependent claims, independent from each other as well as from the features of claim 1, but optionally in any combination with each other constitute further subject-matter of the present disclosure. This also applies to any further features described above or hereinafter. Finally, any device features are also applicable to the method described herein and vice versa.

Although the invention generally refers to containers, reference will be made to capsules in the following. As will be detailed below, the invention enables a both space saving and clean solution with regard to the collection and disposal of empty capsules. In particular, since any food or other liquids remaining in the capsule will be subject to the force of gravity, appropriate measures can be taken below the position, where the capsule is presented to the pet, to collect any such substances. This significantly enhances cleanliness of a pet feeder and convenience for the pet owner.

Preferably, the pet feeding device or pet feeder according to the present invention comprises a bag for accommodating used capsules. As this bag can be regularly disposed it facilitates an easy cleaning of the spillage prone areas in the compartment storing any used capsules. Used capsules will in the following also be called empty capsules, although they may still contain food or food leftovers being prone to contaminate the device. Generally, any type of container for accommodating empty capsules can be provided, but a significantly less stiff and easily deformable bag has the advantage of adapting to the enclosing compartment or being able to accommodate more and more empty capsules as they are being used consecutively.

In the context of a bag for accommodating empty capsules, it provides particular advantages with regard to keeping odors inside the device, keeping insects away from the device and similar effects, if the capsule compartment or its bag is closed by a cover while being used with the device. Advantageously, this cover or cover portion can be integrated with or even integral with, i.e. constituting a portion of the pivoting means or the capsule opening means.

Preferably, means are provided for closing the bag before or during removal. For example, a mechanism can be provided which closes the bag automatically. Alternatively, this may be done manually by the user. Any principle like the following, but not limited to it, may be used: Twisting, gluing, thermal bonding, welding, pulling oppositely integrated strings, wrapping adhesive labels, a zip-lock, which can particularly be closed by pressure, etc. As regards the latter option, it should be mentioned that this corresponds to a zip-lock typically provided in bags for refrigerating or freezing foodstuff. In particular, the bag itself will typically have the means for closing the bag.

For improved space saving, the compartment can be actuated and shifted allowing conveying, such as pivoting means to pass during actuation. This shifting or displacement can, for example, be effected in a vertical direction. However, shifting in a horizontal direction or combinations of both vertical and horizontal directions are also possible.

In particular with regard to a space saving and convenient arrangement, it may provide further advantages, if both full and empty capsules are storable in one and the same compartment of the device. In other words, at one end of such a compartment, filled capsules are consecutively removed and supplied to the feeding position, and for example at the other end of the compartment, the empty capsules are consecutively accommodated in the compartment. As will be detailed below, the above described compartment can be a secondary package of the capsules, and the above described bag can be integrated with the mentioned compartment and/or secondary package. As will also be become more apparent from the explanations below, accommodating filled and empty capsules in one and the same compartment will particularly be enabled by pivoting the capsule to be supplied about approximately 180 degrees and about at least one substantially horizontal axis, which are distant from the feeding position.

Reliable and efficient operation can be achieved, when the containers are, one by one, releasable from a compartment and/or allowed to enter a compartment by the force of gravity and a blocking element that can be moved or opened. For example, this can be at least one blocking element that releases the capsules when they are moved out of the releasing path and otherwise holding the capsules back when being moved into the releasing path. Alternatively, it can be realized by at least one blocking element, which blocks the opening in a radially inner position and opens or widens the opening when moved to a radially outer position. The radially movable element can, for example, be constituted by a latch. A mechanism having plural radially movable elements can be called an iris mechanism.

The opening in the outer radial part of the conveying means may thus serve as a holding and releasing mechanism for the capsule during reloading, actuation, opening, feeding and disposal. This can, for as example, be facilitated by a plate having a bore or hole in connection with another plate having a wider hole or bore that allows the container to pass through with a narrower bore enclosing the lower or mid part of the container. An alternative is a gripping mechanism in the pivoting means that either holds the container in place or is open wide enough to let a container pass through.

Preferably, the device comprises means for conveying the container from one to another location within the device. Along the conveying path, on which single or plural containers are transported, certain actions, such as opening the container, presenting the opened container to the pet, disposing of the container and reloading one or more containers can be performed. In this context, the conveying can initiate further mechanisms and/or steps, such as opening the container, as described in more detail below.

The conveying mechanism may consist of pivoting means for pivoting a container to be supplied about at least one substantially horizontal or vertical axis. In particular, this axis is preferably outside the container to be pivoted. Moreover, the pivoting means are preferably adapted to pivot a single container. In other words, the device is adapted to both supply and open filled containers, such as capsules or cans, and the containers are pivoted about at least one substantially horizontal axis when being supplied to a position, where the open container is presented to the pet.

It should be mentioned that the pivoting means can have the shape of a part of a ball, globe or cylinder, with a globe being preferred for providing a particularly tight sealing with a compartment for accommodating empty capsules as described below.

Correspondingly, further components of the device, such as at least part of the casing of the device as a whole, a slideable cover of the feeding position, a gripper for gripping the lid and the lever for biasing the lid against the opening direction can have shapes which correspond to a portion of a globe, cylinder but also a flat surface.

Using multiple horizontal axes with the pivoting means enables an actuation, handling the capsules in a constant upright position. For example, pivoting means around two pivoting axes can be implemented by mounting two guide rods in parallel on these two axes and connect their loose ends by a bridge being parallel to the connection of the axes.

Alternatively, plural containers can be pivoted or rotated about a typically vertical axis in the manner similar to a revolver. As a further alternative, plural containers can be conveyed linearly in order to sequentially be located at appropriate stations, where the above-described steps are respectively taken.

In this context, the pet feeder advantageously also comprises a lever for biasing the lid being opened in a direction opposite to the opening direction. Consequently, the lid is kept tensioned during the opening movement, so that the formation of wrinkles or similar deformations can be minimized. This also minimizes the risk of food sticking to the lid spoiling the surroundings, and in particular any surrounding components of the pet feeder.

Due to the disposal added by gravity, a certain amount of space is needed in a vertical direction. This can advantageously be used in addition to store a significant number of capsules in the device in order to avoid frequent reloading. Since this will let the feeding position rise in a vertical direction, the pet feeding device preferably comprises a step or platform which allows the pet to get close enough, in a vertical direction, to the feeding position.

The pet feeder described herein can also have a camera and/or RFID reader in order to identify a pet approaching the device and in order to initiate supplying and opening a filled capsule at the appropriate time.

Since it is sometimes desirable to heat the pet food, the device can finally comprise a heater.

In accordance with the preferred embodiments of the pet feeding device, it will be advantageous to seal a bag for accommodating empty capsules, after they have been supplied and emptied. In this context, it should also be mentioned, that the lid is preferably brought back onto or into the empty capsule before disposing the capsule into the compartment.

The above-mentioned object underlying the invention is further achieved by providing a method for supplying and opening a filled container, in which the edge of the container is indented and/or bent before opening.

In order to facilitate the opening, the lid is preferably biased in a direction opposite to the opening direction during opening, as described above.

Preferably, the container is pivoted about at least one substantially horizontal axis.

This method can be used for actuation of any type of containers also outside the field of pet feeding. An example may be the handling of capsules filled with food or granulates to be presented singularly.

The same applies to the device for supplying and opening containers described above and hereinafter.

BRIEF DESCRIPTION OF THE DRAWINGS

Hereinafter, a preferred embodiment of the invention will be described with reference to the drawings, in which.

DETAILED DESCRIPTION OF PREFERRED EMBODIMENTS OF THE INVENTION

Figure 1:
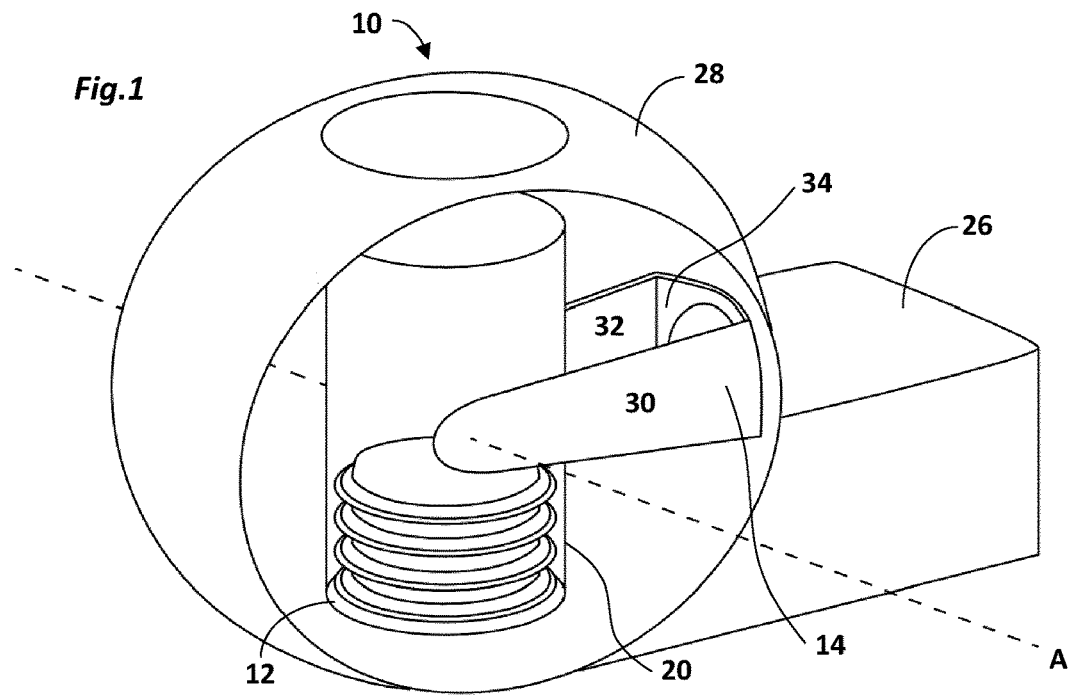
FIG. 1 schematically shows the general design of a pet feeding device.

As can be taken from the schematic drawing of FIG. 1, the pet feeding device 10 has, in the embodiment shown, a main part 28 having the general appearance of a part of a globe, and a platform 26. Since the containers containing pet food are presented essentially at the top of the main part 28, as will be detailed below, the platform 26 serves to allow the pet to reach this top area.

Essentially in the center of the main part 28, there is a compartment 20 containing containers 12, in the embodiment shown in the form of capsules. A pivoting means 14 is provided for pivoting about an essentially horizontal axis A and for delivering a single container from essentially the bottom of the device to the top. In FIG. 1, the pivoting means 14 is shown in an intermediate state. Moreover, it can be seen that it essentially comprises two arms 30, 32 and a bottom 34 for transporting a container 12.

Figure 2:
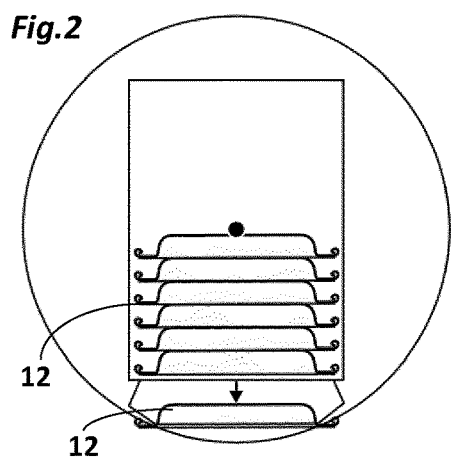
FIG. 2 shows a central part of the pet feeding device, having one pivoting axis, with a single container being released from a compartment.

As can be seen in FIG. 2, having one pivoting axis the containers 12 are essentially provided in an "upside down" state, and means are provided, as detailed below, for allowing a single container 12 to be engaged or gripped by the pivoting means.

Figure 3:
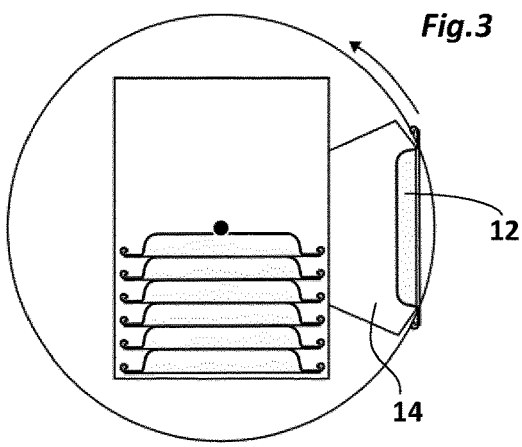
FIG. 3 shows the part corresponding to that of FIG. 2 during pivoting.
Figure 4:
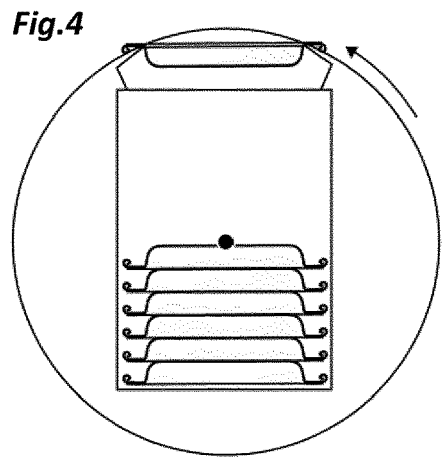
FIG. 4 shows the same at the end of pivoting.

As can be taken from FIG. 3, the pivoting means 14 brings the container 12 to the top of the device, which is shown in FIG. 4. As will be detailed below, the container is opened at this position so that the content of the container is accessible for the pet.

Afterwards, the container is allowed to enter the compartment 20 so that, due to the consecutive use of the filled containers, the compartment 20 is consecutively filled with empty containers, from the top thereof.

Figure 6:
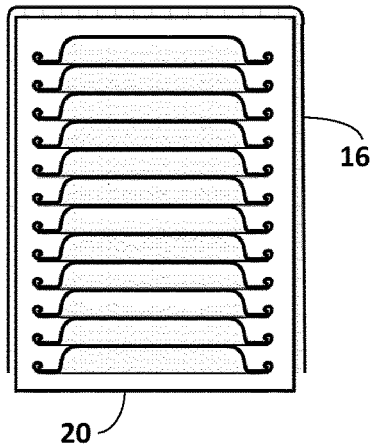
FIG. 6 shows a secondary package, accommodating containers.

FIG. 6 indicates that the compartment 20 can be formed by a secondary package shown as a rectangular box in FIG. 6. In the initial state, the containers are stacked with a bag 16, which later serves as a waste bag, typically wrapped around the top or the sides of the secondary package.

Figure 7:
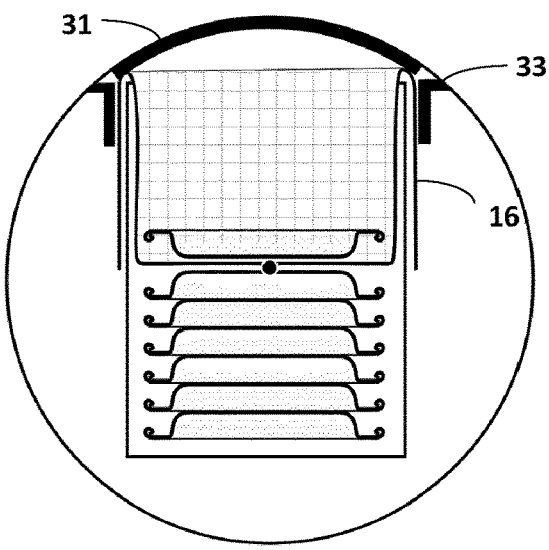
FIG. 7 shows the secondary package of FIG. 6 during use.

As shown in FIG. 7, as soon as the first container to be presented to a pet, i.e. the lowest one in FIG. 6, has been emptied, the bag 16 is, together with the empty container 12, now being the uppermost, allowed to enter the secondary package. When all filled containers have been removed from the secondary package, the complete number of empty containers is in the bag, the bag being accommodated in the secondary package, and the bag can then be removed. A cover 31, that can be part of the device or being separate, closes the secondary package or its bag. This helps to contain odor or protect any ingress of insects. This is further enhanced with a seal 33 between the secondary container or its bag and the cover.

Figure 7A:
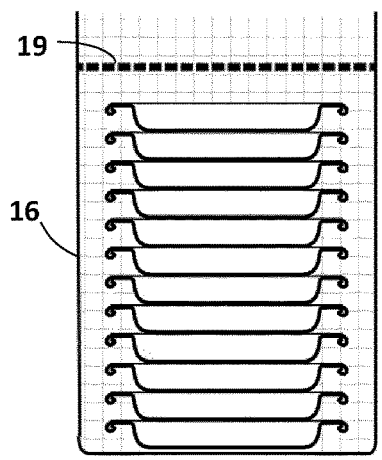
FIG. 7a shows a bag filled with empty containers closable by a zip or bonding area.

FIG. 7a shows the closing of the bag 16, filled with empty containers, before or during removal. In the embodiment shown, reference numeral 19 indicates a zipper or bonding area which can be provided in a top part of the bag 16, in order to close the bag before or during removal thereof. Consequently, any remaining pet food and/or odors can advantageously be kept in the bag.

Figure 7B:
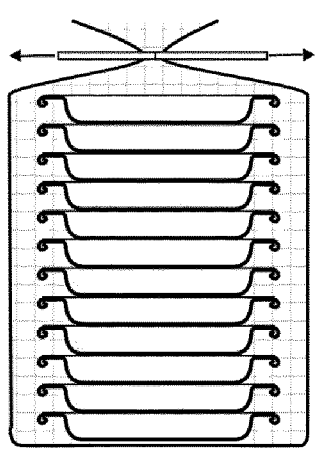
FIG. 7b shows, a bag filled with empty containers closable with two embedded opposite strings.

FIG. 7b shows mechanisms to close the bag before or during removal, with two embedded, opposite strings.

Figure 7C:
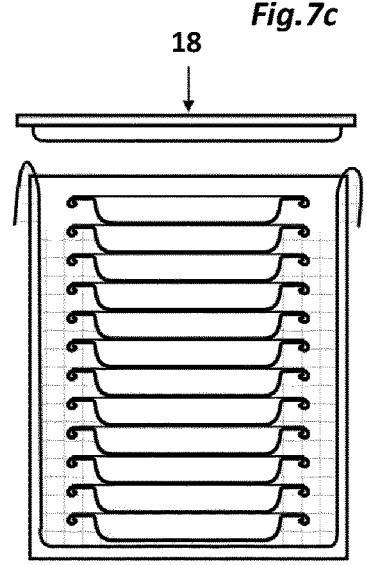
FIG. 7c shows an alternative for closing the bag with a cover.

FIG. 7c shows an alternative for closing the bag before or during removal in the form of a cover 18. However, this measure can also be applied during use of the device as alternative to the cover 31 in FIG. °7 in order, for example, to keep odors inside during use of the device.

Figure 8:
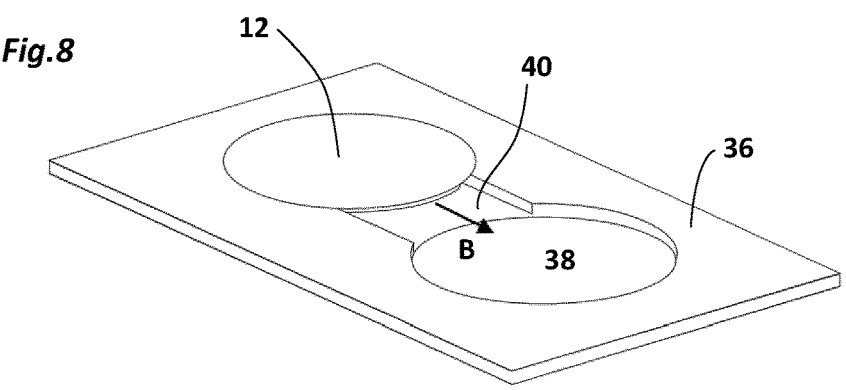
FIG. 8 shows means for releasing a single container.

FIG. 8 shows a first alternative of a mechanism to allow a single container 12 to be released from a compartment (from the bottom according to FIG. 6) or to be allowed to enter the compartment (from the top of FIG. 7). As can be seen in FIG. 8, the mechanism essentially has a plate 36 with a hole 38 wide enough to allow the container 12 to pass therethrough. Adjacent the hole 38, there is a recess 40 or a smaller hole 40 holding the container 12. Consequently, when the plate 36 and the container 12 are moved relative to each other in accordance with arrow B, the container can be allowed to be released from the compartment while the remaining stack of containers stays in the compartment.

Figure 9:
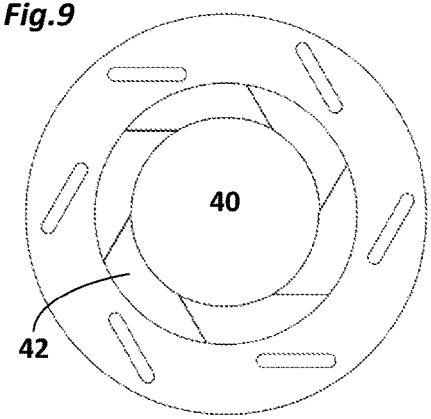
FIGS. 9 and 10 show an alternative means for releasing a container.
Figure 10:
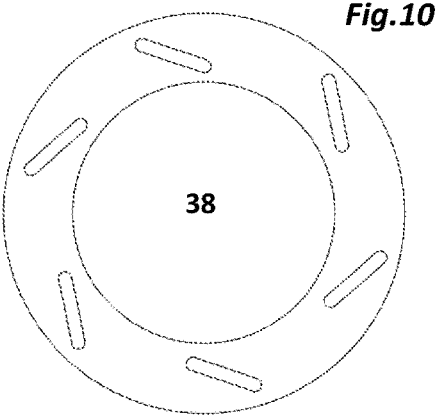

FIGS. 9 and 10 show an alternative mechanism for removing a single container from the compartment. In this case, a so-called iris mechanism is provided having several, in the embodiment shown six radially movable members 42, which are displaced radially in order to provide a wide opening 38 as shown in FIG. 10, whereas the opening is a smaller opening 40 in the state of FIG. 9.

Figure 11:
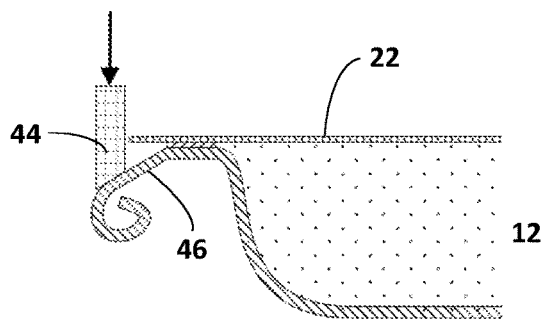
FIG. 11 shows indenting a container lid.

FIG. 11 shows a stamp 44 for indenting an edge 46 of a container 12. In an initial state, both the lid 22 and the edge 46 are in an essentially horizontal state, which is shown for the lid 22 in FIG. 12. This is because the lid 22 is radially shorter, so that the stamp only acts on the edge 46 of the container 12. Thus, the edge 46 of the container is plastically deformed and stays in the inclined state shown in FIG. 12. Corresponding to the width of the stamp 44 (as seen perpendicular to the plane of the drawing of FIGS. 11 and 12) a gap 48 is thus formed between the lid 22 and the edge 46 of the container 12, which can be used to reliably grip and open the lid as shown in FIGS. 13 and 14.

Figure 12:
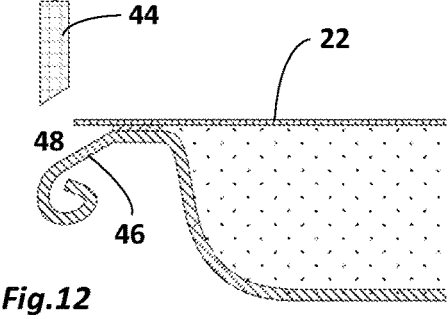
FIG. 12 shows the part of the container also shown in FIG. 11 after indenting.

Alternatively, the lid 22 could be provided radially wider, so that the stamp 44 acts both on the lid 22 and the edge 46, which are, in an initial state, essentially horizontal. Since the lid 22 is made of an elastic material, it returns to its initial orientation even after the stamp 44 is removed, similarly as shown in FIG. 12.

Figure 13:
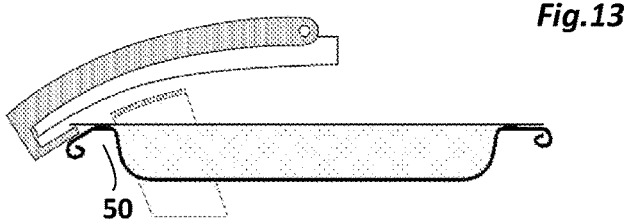
FIGS. 13 and 14 show means for opening a container lid and biasing same in a direction opposite to the opening direction.
Figure 14:
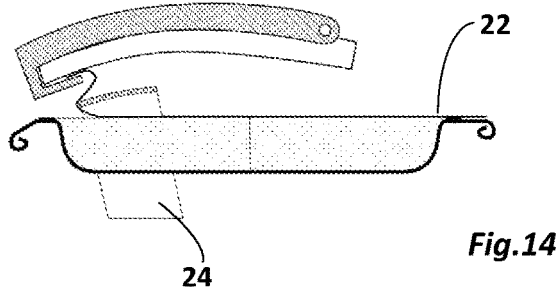

As can be seen in FIG. 13, a protrusion 50 enters the gap 48, when the lid is to be opened, and removes the lid from the container, as can be seen in FIG. 14. This figure also shows a lever 24 for biasing the lid 22 in a direction (to the left in FIGS. 13 and 14) opposite to an opening direction (to the right in FIGS. 13 and 14), in order to minimize formation of wrinkles or similar deformations.

Figure 15:
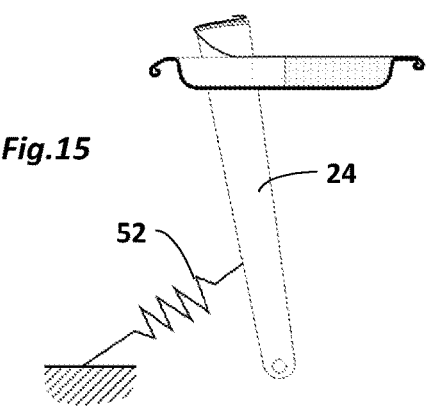
FIG. 15 shows means to bias the lever shown in FIGS. 13 and 14.

FIG. 15 additionally shows the lever 24 being biased in the described direction by means of a spring 52.

Figure 16:
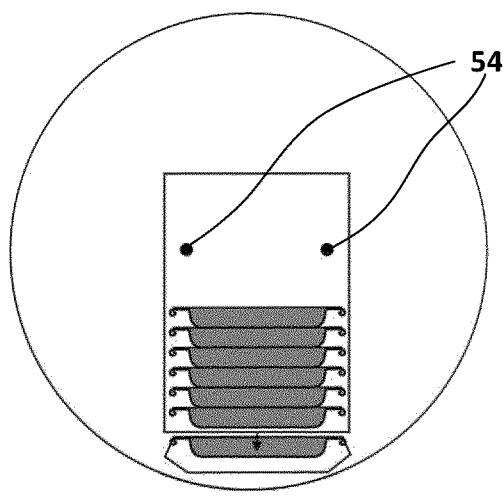
FIG. 16 shows a central part of the pet feeding device, having two pivoting axes, with a single container being released from a compartment.

FIG. 16 shows the actuation principle releasing a container, similar as FIG. 2, but now with two pivoting axes 54 and a shiftable compartment. The containers are supplied in a position with the lid facing upwards.

Figure 17:
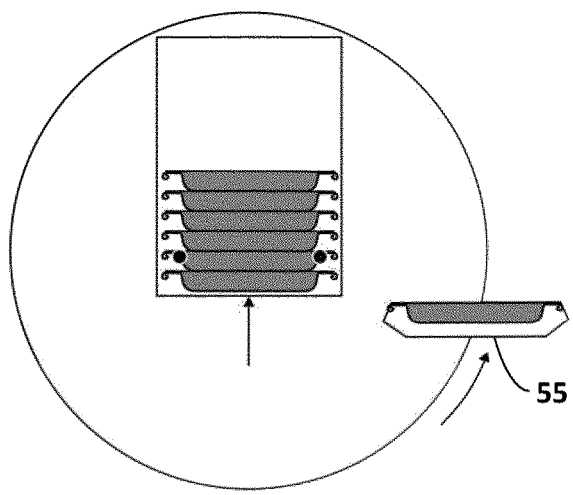
FIGS. 17 and 18 show the part corresponding to that of FIG. 16 during pivoting.
Figure 18:
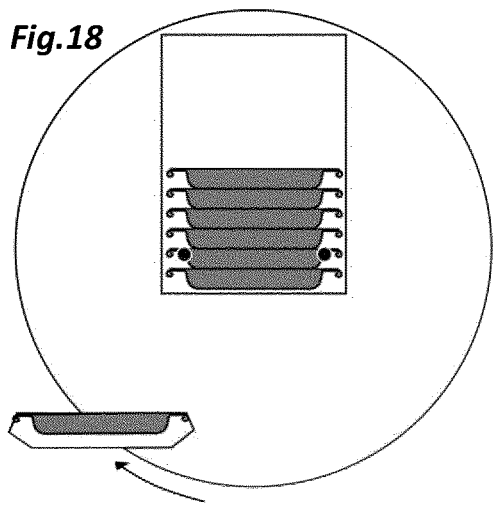

FIG. 17 and ° 18 show the actuation principle moving the container 55 anti-clockwise and clockwise upwards, similar as FIG. 3, but now with two pivoting axes and a shiftable compartment. The actuated container stays in a position with the lid facing upwards.

Figure 19:
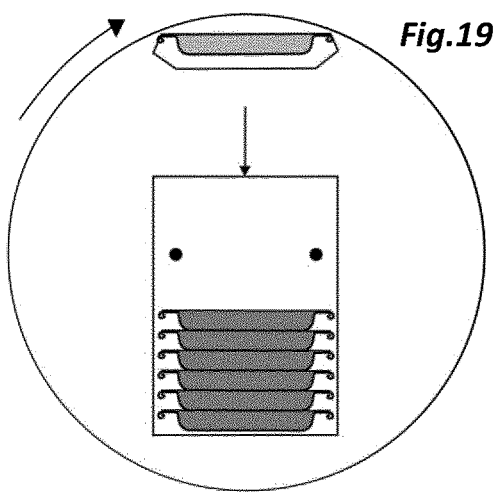
FIG. 19 shows the same at the end of pivoting.

FIG. 19 shows the actuation principle with the pivoting means and the container in the top position, similar as FIG. 4, but now with two axes and a shiftable compartment.

Figure 5:
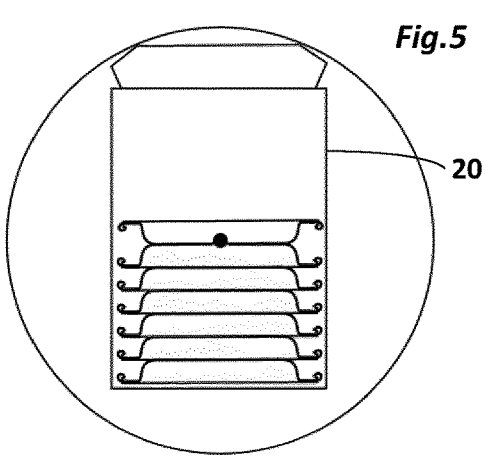
FIG. 5 shows the same after the empty container has been deposited in the compartment.
Figure 20:
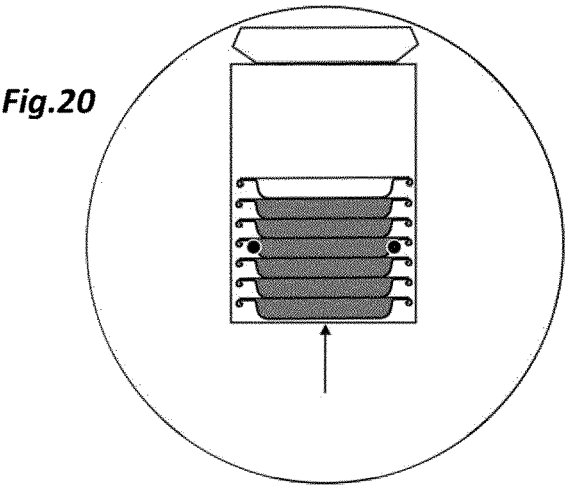
FIG. 20 shows the same after the empty container has been deposited in the compartment.

FIG. 20 shows the actuation principle after the container has been disposed to the compartment similar as FIG. 5 but now with two pivoting axes and a shiftable compartment. Full and empty containers are facing the same direction.

The invention claimed is:

1. A pet feeding device for supplying and opening filled containers, the filled containers having a capsule body with a surrounding flange and a lid, wherein the lid either is not sealed to the flange in at least an outermost few millimeters or is radially shorter than the flange, the pet feeding device comprising:
    at least one stamp for indenting and/or bending the surrounding flange so as to deform the surrounding flange plastically in a direction away from the lid, and to deform the lid elastically so that a gap is formed between the lid and the flange; and
    a lever for biasing the lid being opened in a direction opposite to an opening direction.

2. The pet feeding device of claim 1, wherein the pet feeding device includes a bag positioned to accommodate empty containers.

3. The pet feeding device of claim 2, wherein the bag is closable by a cover.

4. The pet feeding device according to claim 2, further comprising means for closing the bag.

5. The pet feeding device in accordance with claim 1, wherein the containers are individually releasable from a compartment and/or allowed to enter a compartment by a force of gravity and an openable or widenable opening.

6. The pet feeding device in accordance with claim 1, further comprising at least one pivoting means for pivoting a container to be supplied about at least one substantially horizontal or vertical axis.

7. A method for feeding a pet by supplying and opening filled containers, each of the filled containers having a capsule body with a surrounding flange and a lid, wherein the lid either is not sealed to the flange in at least an outermost few millimeters or is radially shorter than the flange, the method comprising:
    using a stamp to indent and/or bend the surrounding flange to deform the surrounding flange plastically in a direction away from the lid, and to deform the lid elastically so that a gap is formed between the lid and the flange, such that the flange is deformed by the stamp; and
    biasing a lid of a container being opened in a direction opposite to an opening direction.

8. The method in accordance with claim 7, further comprising accommodating empty containers in a bag.

9. The method in accordance with claim 8, further comprising closing the bag.

10. The method in accordance with claim 7, wherein the containers are individually released from a compartment and/or allowed to enter a compartment by a force of gravity and an openable or widenable opening.

11. The method in accordance with claim 7, further comprising pivoting the container to be supplied about at least one substantially horizontal axis.

* * * * *